No. 732,338. PATENTED JUNE 30, 1903.
E. H. COTTRELL.
MACHINERY FOR CUTTING AND FOLDING PAPER OR OTHER FABRICS.
APPLICATION FILED SEPT. 20, 1902.
NO MODEL. 7 SHEETS—SHEET 1.
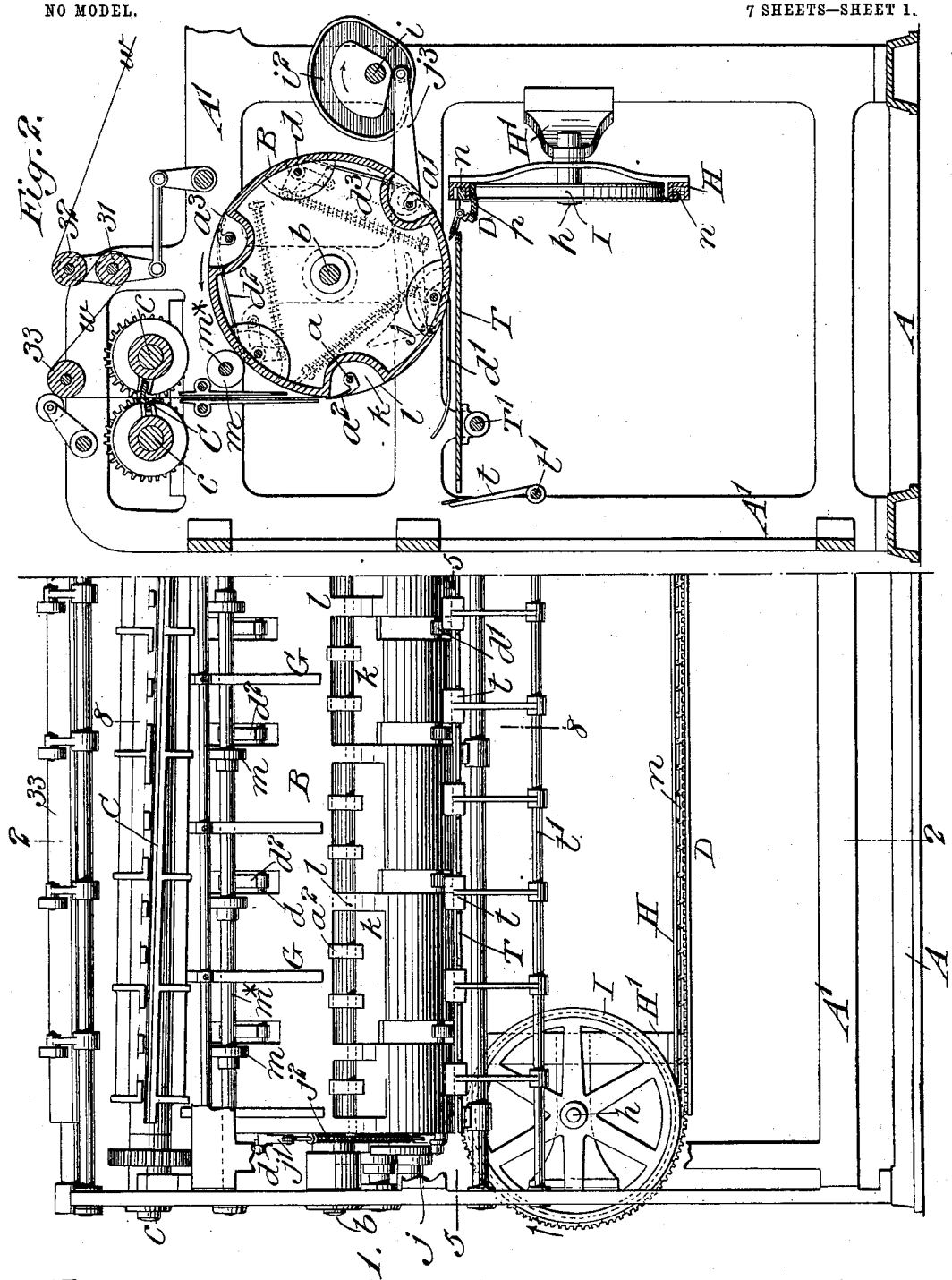
Witnesses:
George Barry Jr
Henry Thieme
Inventor:
Edgar H. Cottrell
by attorneys
Brown & Seward No. 732,338. PATENTED JUNE 30, 1903.
E. H. COTTRELL.
MACHINERY FOR CUTTING AND FOLDING PAPER OR OTHER FABRICS.
APPLICATION FILED SEPT. 20, 1902.
NO MODEL.
7 SHEETS—SHEET 2.
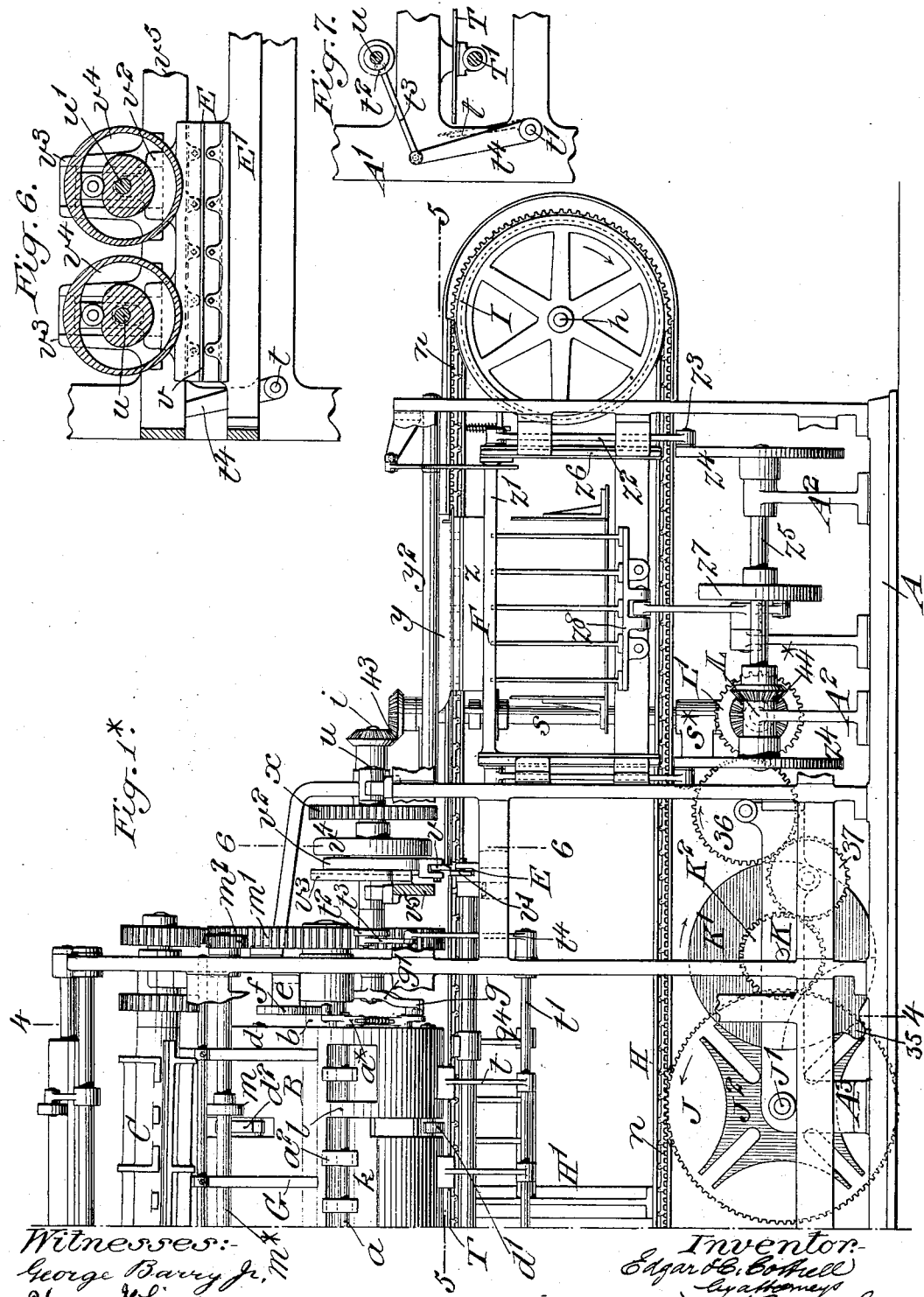

No. 732,338. PATENTED JUNE 30, 1903.
E. H. COTTRELL.
MACHINERY FOR CUTTING AND FOLDING PAPER OR OTHER FABRICS.
APPLICATION FILED SEPT. 20, 1902.
NO MODEL.
7 SHEETS—SHEET 3.
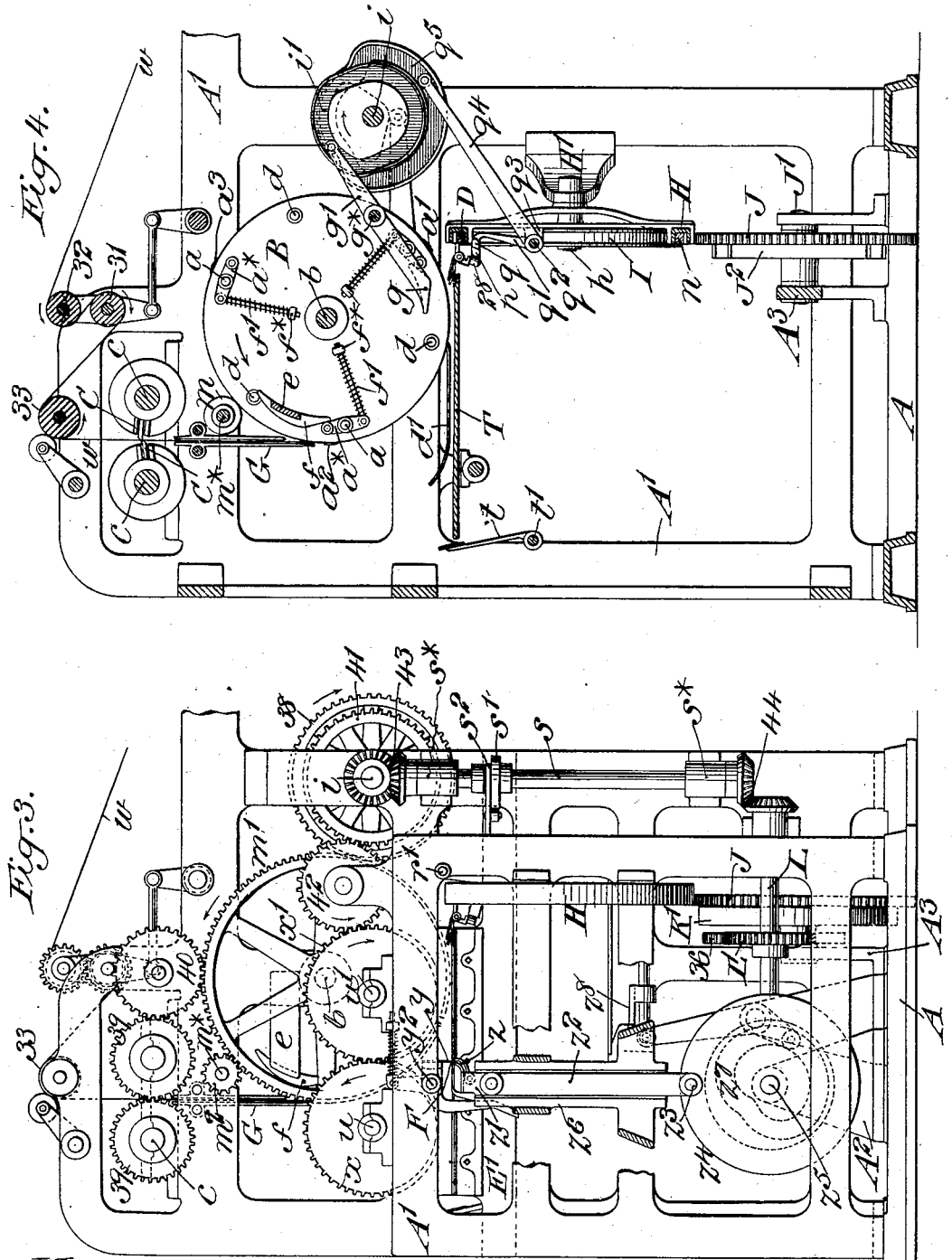

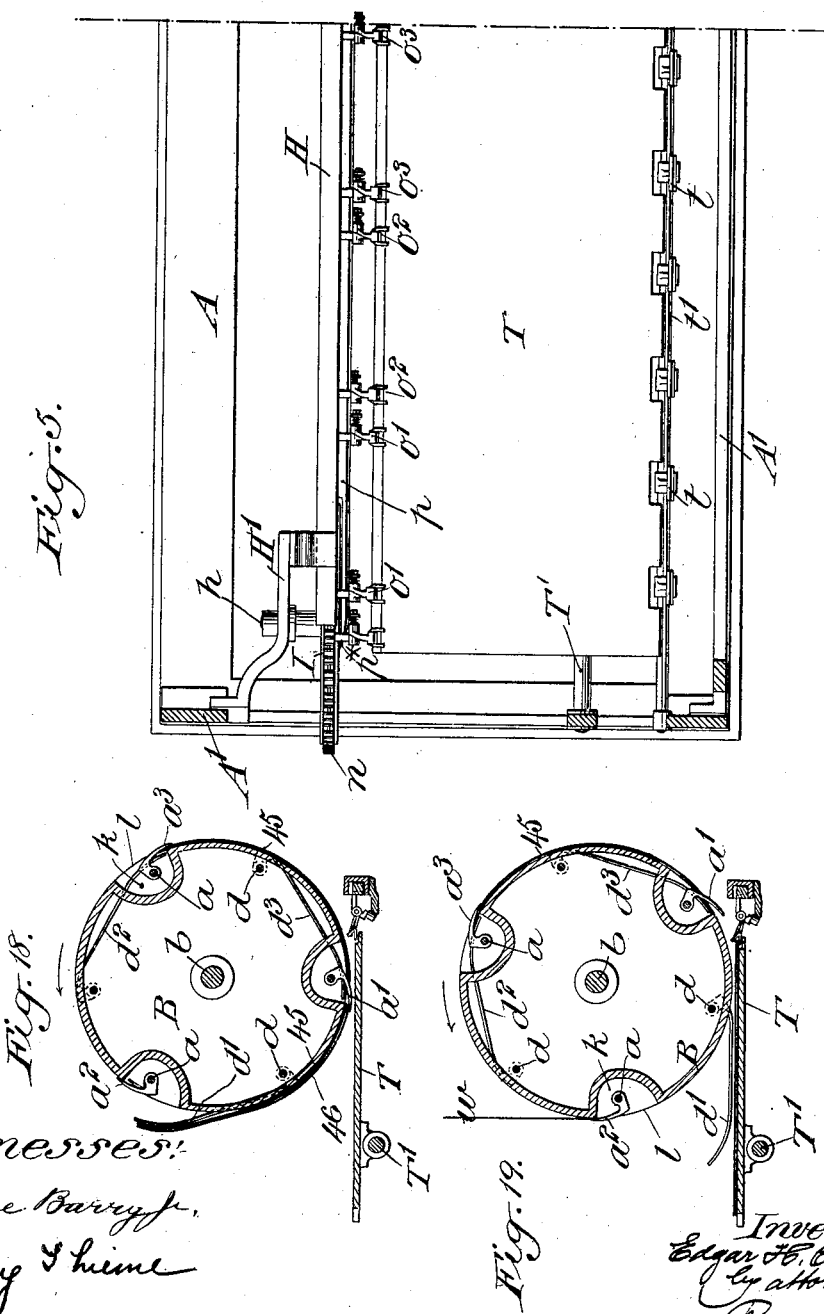

No. 732,338. PATENTED JUNE 30, 1903.
E. H. COTTRELL.
MACHINERY FOR CUTTING AND FOLDING PAPER OR OTHER FABRICS.
APPLICATION FILED SEPT. 20, 1902.
NO MODEL. 7 SHEETS—SHEET 5.
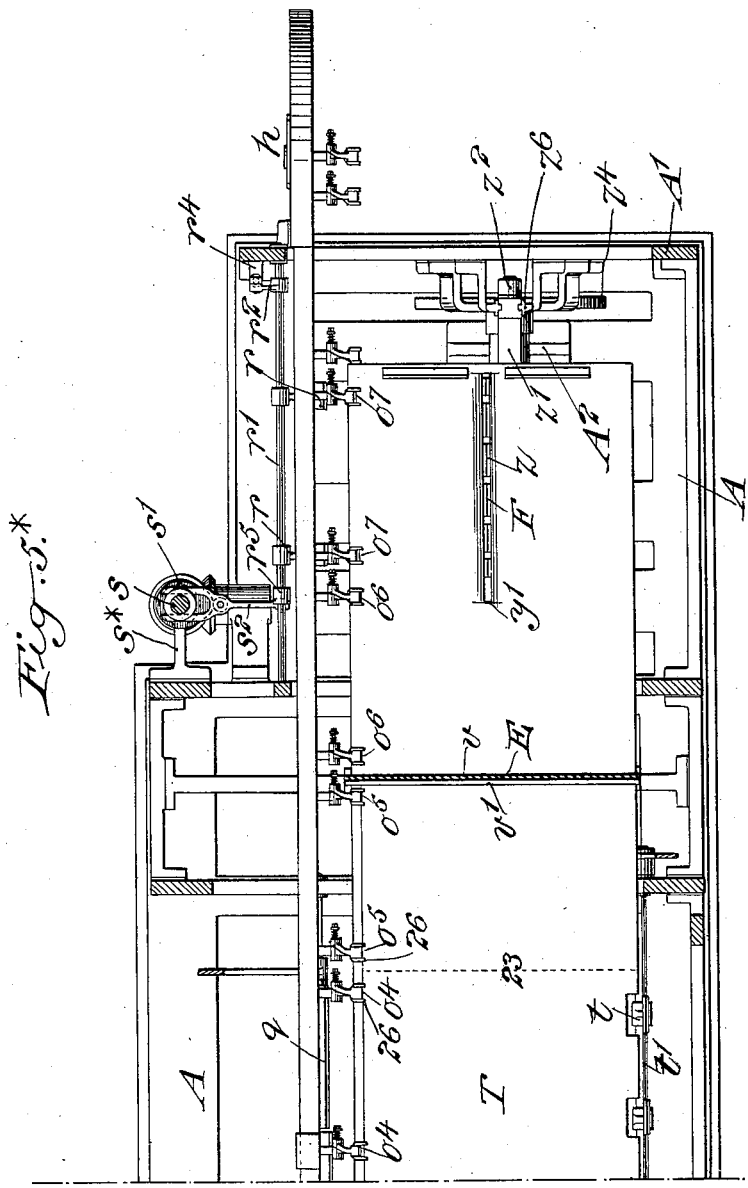

No. 732,338. PATENTED JUNE 30, 1903.
E. H. COTTRELL.
MACHINERY FOR CUTTING AND FOLDING PAPER OR OTHER FABRICS.
APPLICATION FILED SEPT. 20, 1902.
NO MODEL. 7 SHEETS—SHEET 6.
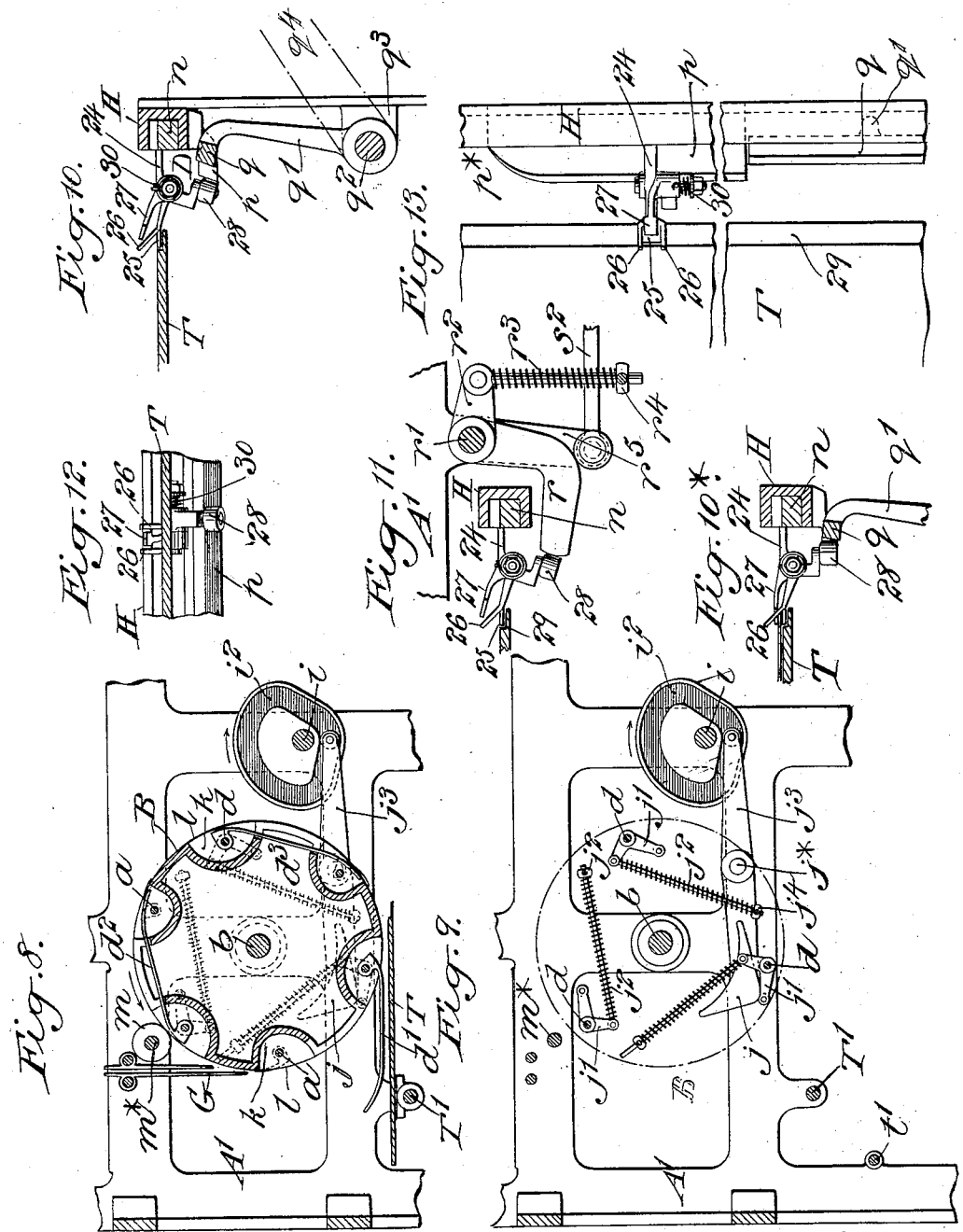
Witnesses:
George Barry Jr
Henry Thiene
Inventor:
Edgar H. Cottrell
By attorneys
Brown & Seward No. 732,338. PATENTED JUNE 30, 1903.
E. H. COTTRELL.
MACHINERY FOR CUTTING AND FOLDING PAPER OR OTHER FABRICS.
APPLICATION FILED SEPT. 20, 1902.
NO MODEL. 7 SHEETS—SHEET 7.
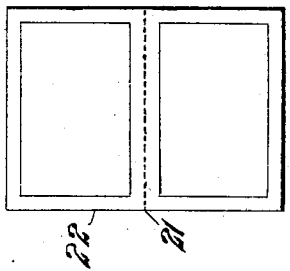
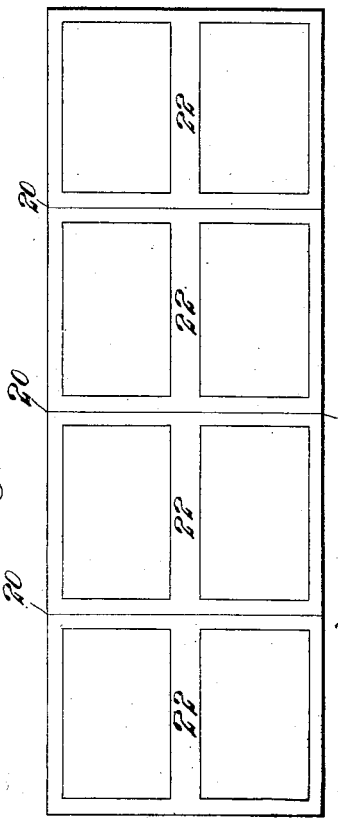
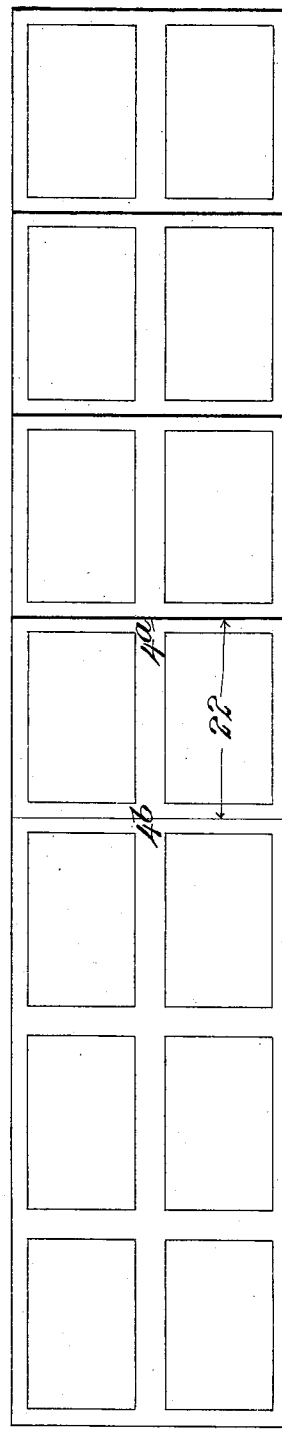
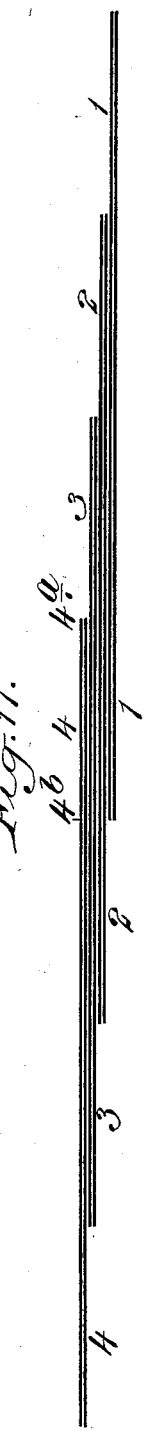
Witnesses:-
George Barry Jr.
Henry Thieme
Inventor:-
Edgar H. Cottrell
By attorneys
Brown & Seward No. 732,338. Patented June 30, 1903.

UNITED STATES PATENT OFFICE.

EDGAR H. COTTRELL, OF STONINGTON, CONNECTICUT, ASSIGNOR TO C. B. COTTRELL & SONS COMPANY, OF NEW YORK, N. Y., AND STONINGTON, CONNECTICUT, A CORPORATION OF NEW JERSEY.

MACHINERY FOR CUTTING AND FOLDING PAPER OR OTHER FABRICS.

SPECIFICATION forming part of Letters Patent No. 732,338, dated June 30, 1903.

Application filed September 20, 1902. Serial No. 124,158. (No model.)

*To all whom it may concern:*

Be it known that I, EDGAR H. COTTRELL, a citizen of the United States, and a resident of Stonington, in the county of New London and State of Connecticut, have invented a new and useful Improvement in Machinery for Cutting and Folding Paper or other Fabrics, of which the following is a specification.

The cutting and folding machinery which constitutes this invention is more especially intended to be used in connection with a printing-machine in which the printing of the necessary number of pages for a signature is performed on a continuous web before cutting the latter into sheets.

Machinery embodying the invention in its entirety comprises a collecting and imposing cylinder or drum for taking sheets cut transversely from a web and collecting the so-taken sheets one upon another on its periphery and depositing and superposing the so collected and imposed sheets upon a table, a carrier for moving the so deposited and superposed collections of sheets intermittently along said table, cutters located in proper relation to said table and operating to cut several of said superposed collections of sheets together into smaller sheets at one operation during intermissions in the movement of the carrier, and a folding device in proper relation to said table for folding several of the superposed smaller sheets into a signature.

The invention consists in certain combinations hereinafter described and claimed, in which such collecting-cylinder, carrier, cutters, and folding devices or one or more of them constitute an element or elements.

In the accompanying drawings, Figures 1 and 1* together represent a front elevation of cutting and folding machinery embodying the whole of the invention; Fig. 2, a transverse vertical section in the line 2 2 of Fig. 1; Fig. 3, a right-hand end view of the same; Fig. 4, a transverse vertical section in the line 4 4 of Fig. 1*; Figs. 5 and 5*, a horizontal section in the line 5 5 of Figs. 1 and 1*; Fig. 6, a transverse vertical section in the line 6 6 of Fig. 1*; Fig. 7, a detail view which will be hereinafter explained; Fig. 8, a transverse section of the collecting-cylinder and table in the line 8 8 of Fig. 1; Fig. 9, an end view of mechanism appurtenant to the collecting-cylinder; Figs. 10, 10*, 11, 12, 13, views of some details, to be hereinafter explained, of the table and carrier on a larger scale than the preceding figures; Fig. 14, a plan view of one of the printed sheets cut from a web and collections of which the example of the invention represented is adapted to cut into smaller sheets and fold; Fig. 15, a plan view of one of the smaller sheets cut from the sheet shown in Fig. 14 and ready for folding with other similar smaller sheets into a signature; Fig. 16, a plan view of a train of such printed sheets, illustrating the order of their passage to the cutting and folding devices for the production of signatures; Fig. 17, an edge view corresponding with Fig. 16. Figs. 18 and 19 are transverse sectional views of what is herein termed the "collecting-cylinder."

A is the bed-plate, supporting the main framing A', in which are the bearings for the shafts $c$, which carry the rotary blades of the cutter C for cutting the sheets from the web and in which below said cutter are the bearings for the shaft $b$ of the collecting cylinder or drum B, hereinafter referred to as the cylinder. Directly under this cylinder B there is supported in said framing the stationary table T, upon which sheets collected one upon another are deposited together.

D is the endless carrier, comprising an endless rack and attached grippers by which the sheets, such as are shown in Fig. 14 deposited and superposed upon the table T by the collecting-cylinder B, are first carried to a cutting device E, Figs. 1* and 6, to be cut on the lines 20, Fig. 14, into smaller sheets, Fig. 15, which are carried to a folding device F, Figs. 1* and 3, to be folded into signatures on the lines 21, Fig. 15.

The collecting-cylinder B has a circumference equal to a sufficient length of web to produce three of the sheets 22, which are to be cut therefrom by successive operations of the cutter C. The said cylinder is furnished with grippers $a'$ $a^2$ $a^3$, Figs. 1, 1*, and 2, for collecting upon it and imposing one upon another, as will be hereinafter explained, the sheets cut by the cutters C. It is also furnished with knockers $d'$ $d^2$ $d^3$, Figs. 1, 1*, and 8, for knocking off the tail edges of the so collected and imposed sheets from the cylinder, so that the said sheets may be laid together one upon another flat upon the table T and so left thereon when liberated by the grippers. The grippers $a'$ $a^2$ $a^3$ are, like the grippers commonly used upon the cylinders of printing and other machines, carried by shafts $a$, arranged lengthwise of the cylinder in suitable bearings therein. The knockers $d'$ $d^2$ $d^3$ consist of long thin arms carried by shafts $d$, arranged lengthwise of the cylinder in suitable bearings therein, the said arms being, as shown in Fig. 8, of a form to sheath themselves within the cylinder or project from the cylinder over the table T, as will be understood by reference to that figure. There may be any suitable number of grippers on each shaft $a$ and any suitable number of knockers on each shaft $d$. The knocker-shafts $d$ intervene with the gripper-shafts $a$. In the example of the invention selected for illustration there are three shafts $a$ and sets of grippers $a'$ $a^2$ $a^3$ and a corresponding number of shafts $d$ and sets of knockers $d'$ $d^2$ $d^3$. For the purpose of opening the grippers to receive sheets there is secured to the framing A' at one end of the cylinder B by a bracket $e$ a stationary cam $f$, (see Figs. 1*, 3, and 4,) against which run rollers on levers $a^*$, provided on the ends of the gripper-shafts $a$ outside of the cylinder. The closing of the grippers is effected in a well-known way (illustrated in Fig. 4) by springs $f'$, applied between the opposite ends of said levers and eyebolts $f^*$ on the end of the cylinder. The cylinder and the gripper-opening cam $f$ are arranged in such relation to the cutters that the grippers will take the end of the web $w$ before the sheet is cut from the latter. To conduct the free end of the web to the grippers and conduct the cut sheets to the cylinder, stationary guides G are provided between the cutters and cylinder. For the purpose of opening the grippers to liberate the imposed collections of sheets for deposit on the table T there is provided just over one edge of the table a tripping-cam $g$, Fig. 4, under which the rollers on the gripper-shaft levers $a^*$ pass in the revolution of the cylinder. This cam $g$ consists of a projection on a lever $g'$, which works on a fixed fulcrum $g^*$ and which is actuated for the purpose of pulling the said cam $g$ into and out of its operative position by a rotary cam $i'$ on a shaft $i$, which is arranged parallel with the cylinder in suitable bearings in the framing A'. The shaft $i$ makes one revolution for every two-thirds of a revolution of the collecting-cylinder B, and hence it places the cam $g$ in operative position three times during every two revolutions of the cylinder, and so each set of grippers is only opened by said cam during every other two-thirds of a revolution of the cylinder. Now as each set of grippers is opened to receive a sheet every time it passes the cam $f$, but is only opened for the liberation of the sheets every other time it passes the cam $g$, it will be understood that two sheets are collected and imposed one upon another on the cylinder by each set of grippers before either sheet is liberated to be deposited upon the table T and then both are liberated together to be deposited and imposed one upon the other in a couple on the table.

The three sets of knockers $d'$ $d^2$ $d^3$ are so arranged upon the cylinder that either set will, as illustrated in Fig. 18, be approaching the table just as the set of grippers immediately in advance of it—$a'$, for example—which have collected two sheets 45 46 on the cylinder, are approaching the sheet-liberating cam $g$ to be opened. Then just before this opening takes place the corresponding set of knockers $d'$ will be thrown out from the cylinder, as illustrated in Figs. 18 and 19, of which Fig. 18 represents them as just commencing to be thrown out and Fig. 19 as completely thrown out and about to return into the cylinder. The throwing out of the knockers is effected by means of a tripping-cam $j$, Figs. 2, 8, and 9, under which run rollers on elbow-levers $j'$, provided on the ends of the knocker-shafts $d$ outside of the cylinder. The return of the knockers to the positions in which they are sheathed within the cylinder and held there between their successive operations is effected by means of pushing-springs $j^2$, connected with their elbow-levers $j'$ and having their bearings against eyebolts $j^4$ in the ends of the cylinder. The tripping-cam $j$ consists of a projection on a lever $j^3$, which works on a fixed fulcrum $j^*$ and is actuated for the purpose of putting said cam $j$ into and out of its operative position by a rotary cam $i^2$ on the shaft $i$, which brings said cam $j$ into the operative position some time before the corresponding set of grippers is opened by the cam $g$, before described, to liberate the two sheets which had been thereby collected together upon the cylinder. This operation of the knockers only takes place when the set of grippers in advance of them which have collected two sheets are to be opened, the cam $i^2$ holding the cam $j$ out of its operative position during the passing by of the alternating sets of grippers, which have only taken one sheet.

To afford a continuous bearing for the sheets across the cavities $k$, provided in the periphery of the cylinder for the grippers, the said cavities are bridged at intervals, as shown at $l$ in Figs. 1, 1*, 2, and 8, the said bridges completing the periphery of the cylinder across said cavities, so that narrow rollers $m$, (see Figs. 1, 1*, 2, 4, and 8,) arranged to run in contact with any sheets that may be on the cylinder, may operate continuously all around the cylinder, the said rollers being arranged opposite said bridges upon a shaft $m^*$, which is arranged parallel with the cylinder in suitable bearings in the framing. These rollers serve to confine to the cylinder and keep in register the first sheets taken by the grippers while the latter are open to receive the second sheets. The said rollers are driven at a surface speed corresponding with that of the cylinder by a spur-gear $m'$, Figs. 1* and 3, on the cylinder gearing with a spur-gear $m^2$ on the shaft $m^*$.

In the example of a sheet shown in Fig. 14 the greater dimension represents the full width of the web and is presented to the cylinder B lengthwise of the latter. The said sheet is represented as having eight pages on a side and is to be cut on the lines 20 into four smaller sheets 22, which are to be folded on the line 21, each of said smaller sheets consisting of four pages, two on a side, and four couples of said smaller sheets forming a signature of thirty-two pages. The signature is not, however, all made up from one couple of the larger sheets, but from smaller sheets taken each from one of four different couples of the larger sheets, which have been collected and imposed on the cylinder and deposited thereby on the table T, as hereinafter described, during intermissions in the movement of the endless carrier D.

The table T is represented as supported fixedly on a stationary bar T', the ends of which are supported in the framing A'. The width of said table is sufficient to contain the lesser dimension or two-page width of the sheets. The length of said table, which runs in a direction parallel with the axis of the cylinder, reaches from that end of the cylinder which appears at the left in Fig. 1 the whole length of the cylinder and is extended a distance beyond that end thereof which is to the right of Fig. 1* equal to or not less than the length of three of the smaller sheets 22. In the so-extended portion of the table the cutter (designated as a whole by the letter E in Figs. 1* and 5*) is arranged transversely to the table at a distance beyond the right-hand end of the cylinder equal to the length of one of the smaller sheets 22, and in the terminal portion of the table farthest from the cylinder the folder (designated as a whole by the letter F in Figs. 1* and 5*) is arranged lengthwise in the middle of the table.

The endless carrier, which has been hereinbefore designated as a whole by the letter D and which runs along one edge of the table, is represented as consisting of a single endless rack $n$ of well-known construction, furnished with grippers $o'$ $o^2$ $o^3$ $o^4$ $o^5$ $o^6$ $o^7$ for taking one edge of the sheets and running in a slideway in a stationary frame H, supported in brackets H' on the main framing. This rack $n$ is carried by wheels I, having their axles $h$ supported in the brackets H' and frames H and is driven intermittently by a spur-gear J, which receives an intermittent motion, as will be hereinafter described.

The grippers $o'$ $o^2$ $o^3$ $o^4$ $o^5$ $o^6$ $o^7$ are in such number and so spaced that there may be two to receive each of as many of the sheets 22 or of the uncut sections 22 of the longer sheets which are to form said shorter sheets as may be at any time arranged one before another on the table T, which makes eight of said grippers, as $o'$ $o^2$ $o^3$ $o^4$, to be included within the length of the cylinder and six of them $o^5$ $o^6$ $o^7$ for the portion of the table which extends beyond the length of the cylinder, as may be understood by reference to Figs. 5 and 5*, in the latter of which figures the dotted line 23 indicates the right-hand end of the space above the table which is occupied by the cylinder. The construction of these grippers is illustrated in Figs. 10, 10*, 11, 12, 13, of which Figs. 10, 10*, and 11 are transverse sectional views, Fig. 12 a face view, and Fig. 13 a plan. Each of said grippers consists of two members 24 27, of which one, 24, connected rigidly with the rack, has its end in the form of a three-pronged fork 25 26 26, of which one prong 25 runs in a rabbet 29, formed in the edge of the table, and the other two 26 26 are turned upward to form a stop, against which come the edges of the sheets deposited upon the table by the collecting-cylinder B. The other member 27 is pivotally connected with the member 24, and a coil-spring 30 is so applied in a well-known manner to the pivotal connection as to exert a constant tendency to close the gripper. The tail of said member 27, extending below the pivotal connection, is furnished with a friction-roller 28, which runs along cams $p$ $q$, located beside the table. The cam $p$, which is stationary, is shown in Figs. 10 and 13 and also in Figs. 2 and 4. It is carried by the rack-frame H and extends from a point opposite the left-hand end of the cylinder a distance a little greater than the length of three of the sheets or sections 22. It has a straight edge, which is simply rounded or beveled, as shown at $p^*$, Figs. 5 and 13, at the end which corresponds with the left-hand end of the cylinder for the purpose of opening the grippers as they pass that end. This cam $p$ holds the grippers open so long as they run along it. The cam $q$, which is shown in Figs. 10 and 13 and also in Fig. 4, is for controlling the closing of the grippers. It consists of a straight bar of a length a little less than that of a sheet or section 22, and it is arranged opposite that portion of the table which receives the most forward section 22 of a sheet that may be deposited thereon by the cylinder B. The said cam $q$ is carried by the arms $q'$ of a rock-shaft $q^2$, which is arranged in brackets $q^3$ on the rack-frame H, and this rock-shaft carries another arm $q^4$, which engages, as shown in Fig. 4, with a cam $q^5$ on the rotary shaft $i$, hereinafter described. The said cam $q^5$ serves to throw the cam $q$ toward the table to a position in which it is operative on the rack-grippers (shown in Fig. 10*) and back to a position in which it is inoperative thereon, as shown in Fig. 10, as will be hereinafter more fully explained.

Opposite the folding device F there are arranged on the same side of the table as the carrier two tappets $r$ for the purpose of opening the grippers as they arrive with a pile of superposed and cut sheets 22 in the position to be folded into the signature. These tappets, which are shown in the plan Fig. 5* and shown on a larger scale in Fig. 11, are carried by a rock-shaft $r'$, which works in bearings in the framing $A'$. On this rock-shaft is an arm $r^2$, which has connected with it a pushing-spring $r^3$, the lower end of which abuts, as shown in Fig. 11, against a fixed bearing $r^4$, attached to the framing, the said spring serving to hold back the tappets out of range of the rollers 28 of the grippers while the latter are in motion with the rack. For the purpose of giving the tappets $r$ the necessary motion for opening the grippers when the latter have brought the pile of sheets to be folded to a position opposite the folding device, in which position they become stationary opposite said tappets, there is a cam $s'$, Fig. 5*, on an upright rotary shaft $s$, running in bearings in brackets $s^*$, attached to the framing $A'$, the said cam operating on the tappet rock-shaft $r'$ through a yoke-rod $s^2$, which is connected with an arm $r^5$ of said rock-shaft. On the opposite side of the table to the carrier there are arranged joggers $t$ for the purpose of jogging the deposited sheets against the stops 26 of the grippers. These joggers are carried by a rock-shaft $t'$, arranged in fixed bearings in the framing $A'$ and deriving motion from a crank $t^2$, Fig. 7, on one $u$ of the two rotary shafts $u\ u'$, which operate, as will be presently described, the upper blade $v$ of the cutting device, hereinbefore referred to as a whole by the letter E and particularly represented in Fig. 6, the said crank $t^2$ being connected by a rod $t^3$ with an arm $t^4$ on the rock-shaft $t'$. The said cutting device E is represented as consisting of a stationary lower blade $v'$, carried by a suitably-supported cross-bar $E'$ and having its cutting edge protruded upward through a slot in the table, and a reciprocating upper blade $v$, carried by a stock $v^2$, which works in stationary vertical guides $v^3$ on a fixed cross-bar $v^5$, which also supports the bearings for the shafts $u\ u'$. The said stock derives its reciprocating motion from the two cams $v^4$ on the shafts $u\ u'$, which are geared together by spur-gears $x\ x'$. (Shown in Fig. 3.)

The folding device represented, hereinbefore described as a whole by the letter F, is illustrated in Figs. 1* and 3 sufficiently for the purpose of the present invention, the said device being that which is the subject of United States Patent No. 668,393. It consists of a blade $y$ and grippers $z$, the said blade being set with its edge downward over a slot $y'$ in the table T, where it is carried by a rock-shaft $y^2$, which works in stationary bearings in the framing $A'$ above the table, and the said grippers being carried by a horizontal cross-head $z'$, which has such a vertical reciprocating movement in stationary guides $z^6$ as to carry the points of said grippers upward through the said slot and to withdraw them downward therefrom. The said cross-head and grippers derive the said movement through rods $z^2$ from crank-wrists on disks $z^4$, carried by a horizontal shaft $z^5$, which works in bearings in stands $A^2$, erected on the bed-plate A. The said shaft $z^5$ carries also a cam $z^7$ for operating a packer $z^8$; but as this latter does not constitute any part of the present invention no further description of it is necessary.

The web $w$ from which the sheets such as are represented in Fig. 14 are to be cut may be fed to the cutters C at a speed corresponding with that of said cutters in any suitable manner. It is represented (see Figs. 2, 3, 4) as fed by feed-rollers 31 32 and as passing thence to the said cutters over a guide-roller 33. The collecting-cylinder B is at such distance from the cutters that the edge of the web will be taken hold of by the grippers $a'\ a^2\ a^3$ just before each operation of the cutters to sever the sheet from it.

The gear J for driving the endless carrier D is represented as carried by a short shaft $J'$, running in bearings in a stand $A^3$ on the bed-plate A, and the said shaft is represented (see Fig. 1*) as deriving its necessary intermittent motion by the mechanical devices known as the "Geneva stop" from a shaft K, which has its bearings in said stand $A^3$. This device consists of a circular disk $K'$, carried by the said shaft K and carrying a pin 35, which enters successively into each of four radial slots in a disk $J^2$ on the shaft $J'$, the parts of said disk $J^2$ between slots fitting the periphery of the disk $K'$. This device causes the shaft $J'$ and gear J to make a quarter-revolution for one complete revolution of the shaft K and disk $K'$ and to remain stationary during the succeeding three-quarters of a revolution of the last-mentioned shaft and disk. This movement of the gear J gives quick movements during short intervals of time to the carrier D and keeps said carrier stationary during intervening intervals of sufficient length for the deposit of sheets by the collecting-cylinder upon the table T and for the cutting of the so-deposited sheets into the smaller sheets 22 and the folding of said smaller sheets into signatures. The said shaft K derives its motion from a shaft L, Figs. 1* and 3, through gears $L'$ and $K^2$ on the said shafts and intermediate gears 36 37, mounted in the stand $A^3$.

The driving of the several shafts $b\ c\ u\ u'\ s$ $i$ L $z^5$ at the proper relative speeds may be effected in any suitable manner by properly-proportioned gearing. It may be supposed that the shaft $i$ is the driver for all the others and that it is driven by suitable gearing from a printing-machine to which this cutting and folding machinery is an appurtenance, and for this purpose the driving of the other shafts from that one $i$ is represented as provided for in the following manner, as will be understood by reference to Figs. 1*, 3. The shaft $b$ of the collecting-cylinder B is driven by a gear 38 on the said shaft $i$ gearing with the gear $m'$, before mentioned, on the said shaft $b$. The cutter-shafts $c$, which are geared together by gears 39, are driven from the said gear $m'$ through an intermediate gear 40, which gears with one of said gears 39. The cam-shafts $u\ u'$, which operate the cutter $v$, are driven from a gear 41 on said shaft $i$ through an intermediate gear 42 gearing with the gear $x'$ on one of said cam-shafts. The upright shaft $s$ is driven from said shaft $i$ through a pair of miter-gears 43, one on each. The shaft L is driven from the shaft $s$ through a pair of miter-gears 44, one on each. The shaft $z^5$, which operates the folding-grippers and the packer, is driven by a pair of miter-gears 44* from the shaft L. The gearing is all so proportioned that the cutters C, which cut once during each of their revolutions, make three revolutions to every one of the collecting-cylinder B, while the shaft $i$, with its cams $i'$, $i^2$, and $q^5$, the shaft $z^5$ for operating the cutting device E, and the shaft K for operating the carrier D all make three revolutions for every two of the collecting-cylinder, the shaft $J'$ and its gear J making one movement for every two-thirds of a revolution of the collecting-cylinder.

The several parts of the machinery and their respective and relative movements having now been all described, I will proceed to describe their successive operations of cutting the sheets from the web, of collecting said sheets in couples, of depositing the collected couples, each couple piled partly upon and behind its predecessor, of carrying the so-piled sheets along the table to the cutting device E, by which they are cut to produce a pile of shorter sheets 22, and of finally carrying the piles of shorter sheets to the folding device F, by which they are folded into signatures.

Referring first to Fig. 18, in the position of the parts therein shown the grippers $a'$ have collected upon the cylinder two sheets 45 46, one during each of two successive revolutions of the said cylinder, as hereinbefore described. The knocker-cam $j$ (shown in Fig. 9) will then have been placed in position by its controlling-cam $i^2$ on the shaft $i$ to produce the throwing out of the knockers from the cylinder by the continued revolution of the latter and the throwing out of said two sheets from the cylinder toward the table upon which by the further revolution of the cylinder and continued throwing out of the knockers said two sheets are laid together superposed, as shown in Fig. 19. This takes place just before the arrival of the grippers $a'$ at the position shown in the latter figure, in which position they will have been opened to liberate the two sheets and leave them deposited together upon the table by passing under the cam $g$, which had been brought to the proper position by the cam $i'$ on the shaft $i$. This deposit of the sheets upon the table takes place while the carrier D is stationary. While the carrier remains stationary, the jogger $t$ will operate to jog the sheets to register laterally against the stops 26 of the grippers. The carrier D will then move a distance equal to the length of one of the short sheets or sections 22 and again become stationary to receive a collection of two new sheets which will have been successively made upon the cylinder by the gripper $a^3$ during its continued revolution. While either gripper is making a deposit of two sheets upon the table, the next gripper behind it in the order of their revolution takes the end of the web from which its first sheet is to be cut, as illustrated by $a^2$ in Fig. 19, and the next gripper in advance of it has received one sheet 45 and is moving toward the position to receive the second, the operation of each gripper being first to take one sheet 45, then making one-third of a revolution to pass the releasing-cam $g$ without opening, then at the end of one revolution to take a second sheet 46, and finally after another third of a revolution to be opened by said cam $g$ to deposit the two sheets on the table. The superposition or piling of the sheets on the table T, produced by their successive deposits two at a time or, in other words, in couples on said table between the successive movements of the carrier D, is illustrated in Figs. 16 and 17, by reference to which it may be understood that the successive deposits of couples numbered 1, 2, 3, and 4 in their regular order are caused to be carried along in a train in which each deposit is in advance of its successor a distance equal to the length of the shorter sheets 22 to be cut, so that when the first deposit 1 reaches the end of the table there will be four deposits within the length of that most advanced portion $4^a$ $4^b$ of the fourth deposit, which corresponds with the length of said shorter sheets. The next movement of the carrier D after the fourth deposit carries the superposed portions of the four deposits beyond the cutting device E, bringing the line $4^b$ opposite or within the said device, which by its previous operations may be supposed to have cut off the advanced sections 22 of the deposits 1, 2, and 3. The cutting device E then operates and cuts off the forward sections 22 of the deposits 2, 3, and 4, leaving them piled on the rearmost end of deposit 1. The pile of four deposits, making eight four-page sheets 22, is then carried forward by the next movement of the carrier D to the folding device F, which then folds the eight sheets together into a signature of thirty-two pages, which is carried down through the table to the packer or to any suitable receptacle. The same operations of the cutting and folding device occur after every deposit on the table and every movement of the carrier.

In the above-described operation of the carrier its grippers do not operate to seize the sheets until they severally arrive in the position illustrated by the two grippers $o^4$ in Fig. 5*, being up to that time held open successively by the stationary cam $p$ and the movable cam $q$; but as each two arrive opposite the said cam $q$ the said cam is thrown aside from them to permit their being closed by their springs, which keep them closed during the next movement of the carrier. The four superposed couples of sheets are thus all seized together by the carrier-grippers and so carried forward until said grippers arrive at the position illustrated by $o^7$ in Fig. 5*, when the tappets $r$ come into operation to produce their opening, as hereinbefore described.

It may be mentioned, though, perhaps, hardly necessary, that after starting the machinery the sheets 22, cut from the first three deposits, as hereinbefore described, do not make complete signatures, and hence are to be discarded.

It will be readily understood by those skilled in the art how this machinery, though the example represented shows it particularly adapted to the production from four sheets of eight pages of a thirty-two-page signature containing eight sheets of four pages, may be adapted to the production from sheets containing a less or greater number of pages of a signature consisting of a greater or less number of sheets and pages.

What I claim as my invention is—

1. The combination of a table and a rotary collecting-cylinder for collecting a plurality of sheets one at a time and imposing them one upon another on its periphery and depositing the imposed collection directly therefrom upon the table.

2. The combination of a table and a rotary collecting-cylinder, grippers on said cylinder, means for opening and closing said grippers for collecting sheets one at a time and imposing them one upon another on said cylinder, and means for opening said grippers for depositing the imposed collection directly upon the table.

3. The combination of a cutter for cutting sheets from a web, a table, a collecting-cylinder whose circumference is equal to the length of a plurality of sheets cut successively by said cutter, a plurality of sets of grippers on said cylinder, means for opening said grippers in regular succession for the collection one at a time of a plurality of said cut sheets and their imposition on said cylinder, and means for opening said grippers after such collection and imposition for depositing the imposed collection directly therefrom upon the table.

4. The combination of a table, a rotary cylinder furnished with grippers for collecting sheets upon it, means for opening said grippers for the reception and liberation of said sheets, knockers on said cylinder for throwing off the sheets therefrom to the table and means for operating said knockers preparatory to the opening of the grippers for the liberation of the sheets.

5. The combination of a table, a rotary sheet-collecting cylinder furnished with a plurality of sets of grippers at equal distances apart, sets of knockers, corresponding in number with said sets of grippers, attached to said cylinder at intervals between said sets of grippers, and means for opening said grippers and for operating said knockers at proper times for liberating the sheets and knocking them off from the cylinder to the table.

6. The combination of a table, a rotary sheet-collecting cylinder furnished with a plurality of sets of grippers at equal distances apart, a cam for producing the opening of said grippers in regular succession by their revolution with the cylinder for the reception of sheets, a second cam for producing the opening of said grippers by their revolution with the cylinder for the deposit of sheets upon the table, and means for placing said second cam into and out of its operative position during alternate passages of the grippers by it.

7. The combination of a table, a rotary sheet-collecting cylinder furnished with a plurality of sets of grippers at equal distances apart, a cam for producing the opening of said grippers in regular succession by their revolution with the cylinder for the reception of sheets, a second cam for producing the opening of said grippers by their revolution with the cylinder for the deposit of sheets upon the table, a rotary shaft and a cam thereon for placing said second cam into and out of its operative position during alternate passages of the grippers by it.

8. The combination of a table, a rotary sheet-collecting cylinder furnished with a plurality of sets of grippers at equal distances apart, a cam for producing the opening of said grippers in regular succession by their revolution with the cylinder for the reception of sheets, a second cam for producing the opening of said grippers by their revolution with the cylinder for the liberation of the sheets therefrom, sets of knockers attached to the cylinder one for each set of grippers, a third cam for actuating said knockers, and means for placing said second and third cams in operative positions during every other passage by them of the grippers and knockers but at other times keeping them inoperative.

9. The combination of a table, a rotary sheet-collecting cylinder furnished with a plurality of sets of grippers at equal distances apart, a cam for producing the opening of said grippers in regular succession by their revolution with the cylinder for the reception of sheets, a second cam for producing the opening of said grippers by their revolution with the cylinder for the liberation of the sheets therefrom, sets of knockers attached to the cylinder one for each set of grippers, a third cam for actuating said knockers, and a rotary shaft and two cams thereon, one of the last-mentioned two cams for placing respectively said second and third cams in operative positions during every other passage by them of the grippers and knockers but at other times keeping them inoperative.

10. The combination of a table and means for depositing sheets thereon, a carrier for carrying sheets along said table, and means for moving said carrier intermittently for the laying of successive deposits of sheets on the table in a train in which each deposit partly overlaps the preceding one.

11. The combination of a table, a rotary collecting-cylinder furnished with grippers, means for opening said grippers for the reception of sheets and for the deposit thereof on said table, a carrier for carrying sheets along said table, and means for giving said carrier intermittent movements whereby the deposited sheets are laid in a train in which each deposit partly overlaps the preceding one.

12. The combination of a stationary table, means for depositing sheets upon said table, a carrier for carrying sheets along said table, a cutter for cutting sheets on said table, means for giving said carrier intermittent movements whereby the deposited sheets are carried to the cutter in a train in which each deposit partly overlaps the preceding one and several deposits are presented together to the cutter, and means for operating said cutter after every movement of the carrier.

13. The combination of a stationary table, means for depositing sheets upon said table, a carrier for carrying sheets along said table, a cutter for cutting sheets on said table, into smaller sheets, a folder for folding the so-cut smaller sheets, means for giving said carrier intermittent movements whereby the deposits of sheets are carried in a train partly overlapping each other to the cutter and said smaller sheets are carried in a pile to the folder.

14. The combination of a cutter for cutting sheets from a web, a table, a collecting-cylinder furnished with grippers for collecting sheets upon it, means for opening said grippers in regular succession for the reception of said cut sheets, means for opening said grippers after their reception of a plurality of cut sheets for depositing them together on said table, a carrier for carrying sheets along said table, a cutter for cutting sheets on said table into smaller sheets, means for giving said carrier intermittent movements whereby the deposited pluralities of sheets are carried to the cutter in a train in which each deposited plurality partly overlaps the preceding one, and means for operating the latter cutter after every deposit.

15. The combination of a cutter for cutting sheets from a web, a table, a collecting-cylinder furnished with grippers for collecting sheets upon it, means for opening said grippers in regular succession for the reception of said cut sheets, means for opening said grippers after their reception of a plurality of cut sheets for depositing said sheets together on said table, a carrier for carrying said sheets along said table, a cutter for cutting sheets on said table into smaller sheets, a folder for folding the so-cut smaller sheets, and means for giving said carrier intermittent movements whereby the deposited pluralities of sheets are carried to the cutter in a train in which each deposited plurality partly overlaps the preceding one and the so-cut smaller sheets are carried in a pile to the folder.

16. The combination of a stationary table and means for depositing sheets thereon, an endless carrier running at one side of the table and provided with grippers on which there are stops presented toward said side of the table, and a jogger on the opposite side of the table for jogging the sheets up to the stops on the grippers.

17. The combination of a stationary table and means for depositing sheets thereon, an intermittently-moving endless carrier provided with grippers and running at one side of said table, a stationary cam at one side of the table for holding open several of the carrier-grippers at a time during two or more succeeding movements of said carrier, and a movable cam for controlling the closing of said grippers after their passage by said stationary cam.

18. The combination of a stationary table for the reception of sheets, a carrier consisting of an endless rack and normally closed grippers for carrying sheets on said table, a stationary cam at one side of said table for holding open said grippers during the movement of said carrier, a second cam at one side of said table for holding open said grippers during the continuation of said movement beyond the first-mentioned cam, a rotary cam for placing said second cam in a position to permit the closing of the grippers.

19. The combination of a stationary table, an endless carrier arranged at one side of said table and provided with grippers, a collecting-cylinder arranged above and having its axis parallel with said carrier for collecting sheets and depositing them upon said table, means for moving said carrier at intervals a distance equal to part of the length of said cylinder, a stationary cam at one side of the table extending part of the length of the cylinder for keeping open said grippers, and a movable cam at the side of the table extending the remainder of the length of the cylinder for first maintaining the opening and afterward controlling the closing of the grippers.

20. The combination of a stationary table, means for depositing sheets on said table, a carrier arranged at one side of said table and provided with grippers, means for giving said carrier intermittent movements whereby the deposited sheets are carried on said table in a train partly overlapping each other, a cutter arranged transversely to said carrier for cutting the train of deposited sheets into piles of superposed smaller sheets, a folder arranged parallel with the direction of the movements of the carrier for folding said piles, means for opening and holding open said grippers for the reception of the deposited sheets, means for closing said grippers for carrying the train of deposited sheets to the cutter and the piles of cut smaller sheets to the folder, and means for reopening said grippers for the release of the sheets on their arrival at the folder.

In testimony that I claim the foregoing as my invention I have signed my name, in presence of two witnesses, this 17th day of September, 1902.

EDGAR H. COTTRELL.

Witnesses:
FREDK. HAYNES,
GEORGE BARRY, Jr.